US 6,691,210 B2

(12) United States Patent
Faraboschi et al.

(10) Patent No.: US 6,691,210 B2
(45) Date of Patent: Feb. 10, 2004

(54) CIRCUIT AND METHOD FOR HARDWARE-ASSISTED SOFTWARE FLUSHING OF DATA AND INSTRUCTION CACHES

(75) Inventors: Paolo Faraboschi, Brighton, MA (US); Alexander J. Starr, Acton, MA (US); Geoffrey M. Brown, Watertown, MA (US); Richard L. Ford, Lancaster, MA (US)

(73) Assignees: STMicroelectronics, Inc., Carrollton, TX (US); Hewlett-Packard Development Company L.P., Houston, TX (US)

( * ) Notice: Subject to any disclaimer, the term of this patent is extended or adjusted under 35 U.S.C. 154(b) by 165 days.

(21) Appl. No.: 09/751,371

(22) Filed: Dec. 29, 2000

(65) Prior Publication Data

US 2002/0087799 A1 Jul. 4, 2002

(51) Int. Cl.[7] .............................................. G06F 12/00
(52) U.S. Cl. ...................................... 711/135
(58) Field of Search .................................... 711/135

(56) References Cited

U.S. PATENT DOCUMENTS 5,363,496 A    11/1994   Kato et al.
5,835,949 A  * 11/1998   Quattromani et al. ........ 711/135
6,389,512 B1 *  5/2002   Mahalingaiah et al. ...... 711/125

FOREIGN PATENT DOCUMENTS

DE    3832912       5/1989
EP    0 332 303     9/1989

OTHER PUBLICATIONS

Margulis, N.; "1860 Microprocessor Internal Architecture"; Microprocessors and Microsystems, IPC Business Press Ltd., London GB; vol. 14, No. 2; Mar. 1, 1990; XP000102966; pp. 89–96; and.
Bannon, P., et al.; Internal Architecture of Alpha 21164 Microprocessor; Digest of Papers of the Computer Society Computer Conference (Spring) Compcon. Technologies for the information Superhighway; San Francisco; Mar. 5–9, 1995; vol. 1; conf. 40; XP000545418; pp. 79–87.

* cited by examiner

*Primary Examiner*—Jack A. Lane
(74) *Attorney, Agent, or Firm*—Lisa K. Jorgenson; William A. Munck (57) ABSTRACT

A cache flush controller, and an associated method, selectably flushes a memory cache of a data processor. The cache flush controller operates at a memory bus level of the data processor and operates to flush a selected line, or lines of the memory cache by writing arbitrary, selected values to the selected line or lines of the memory cache.

20 Claims, 4 Drawing Sheets

CIRCUIT AND METHOD FOR HARDWARE-ASSISTED SOFTWARE FLUSHING OF DATA AND INSTRUCTION CACHES

CROSS-REFERENCE TO RELATED APPLICATIONS

The present invention is related to those disclosed in the following United States patent applications:

1. Ser. No. 09/751,372, filed concurrently herewith, entitled "SYSTEM AND METHOD FOR EXECUTING VARIABLE LATENCY LOAD OPERATIONS IN A DATA PROCESSOR";
2. Ser. No. 09/751,331, filed concurrently herewith, entitled "PROCESSOR PIPELINE STALL APPARATUS AND METHOD OF OPERATION";
3. Ser. No. 09/751,327, filed concurrently herewith, entitled "CIRCUIT AND METHOD FOR SUPPORTING MISALIGNED ACCESSES IN THE PRESENCE OF SPECULATIVE LOAD INSTRUCTIONS";
4. Ser. No. 09/751,377, filed concurrently herewith, entitled "BYPASS CIRCUITRY FOR USE IN A PIPELINED PROCESSOR";
5. Ser. No. 09/751,410, filed concurrently herewith, entitled "SYSTEM AND METHOD FOR EXECUTING CONDITIONAL BRANCH INSTRUCTIONS IN A DATA PROCESSOR";
6. Ser. No. 09/751,408, filed concurrently herewith, entitled "SYSTEM AND METHOD FOR ENCODING CONSTANT OPERANDS IN A WIDE ISSUE PROCESSOR";
7. Ser. No. 09/751,330, filed concurrently herewith, entitled "SYSTEM AND METHOD FOR SUPPORTING PRECISE EXCEPTIONS IN A DATA PROCESSOR HAVING A CLUSTERED ARCHITECTURE";
8. Ser. No. 09/751,674, filed concurrently herewith, entitled "CIRCUIT AND METHOD FOR INSTRUCTION COMPRESSION AND DISPERSAL IN WIDE-ISSUE PROCESSORS";
9. Ser. No. 09/751,678, filed concurrently herewith, entitled "SYSTEM AND METHOD FOR REDUCING POWER CONSUMPTION IN A DATA PROCESSOR HAVING A CLUSTERED ARCHITECTURE"; and
10. Ser. No. 09/751,679, filed concurrently herewith, entitled "INSTRUCTION FETCH APPARATUS FOR WIDE ISSUE PROCESSORS AND METHOD OF OPERATION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to data processors and, more specifically, to a memory-mapped cache flushing device for use in a data processor.

BACKGROUND OF THE INVENTION

The demand for high performance computers requires that state-of-the-art microprocessors execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

A pipelined processor is capable of executing several different machine instructions concurrently. This is accomplished by breaking down the processing steps for each instruction into several discrete processing phases, each of which is executed by a separate pipeline stage. Hence, each instruction must pass sequentially through each pipeline stage in order to complete its execution. In general, a given instruction is processed by only one pipeline stage at a time, with one clock cycle being required for each stage. Since instructions use the pipeline stages in the same order and typically only stay in each stage for a single clock cycle, an N stage pipeline is capable of simultaneously processing N instructions. When filled with instructions, a processor with N pipeline stages completes one instruction each clock cycle.

The execution rate of an N-stage pipeline processor is theoretically N times faster than an equivalent non-pipelined processor. A non-pipelined processor is a processor that completes execution of one instruction before proceeding to the next instruction. Typically, pipeline overheads and other factors decrease somewhat the execution rate advantage that a pipelined processor has over a non-pipelined processor.

An exemplary seven stage processor pipeline may consist of an address generation stage, an instruction fetch stage, a decode stage, a read stage, a pair of execution (E1 and E2) stages, and a write (or write-back) stage. In addition, the processor may have an instruction cache that stores program instructions for execution, a data cache that temporarily stores data operands that otherwise are stored in processor memory, and a register file that also temporarily stores data operands.

The address generation stage generates the address of the next instruction to be fetched from the instruction cache. The instruction fetch stage fetches an instruction for execution from the instruction cache and stores the fetched instruction in an instruction buffer. The decode stage takes the instruction from the instruction buffer and decodes the instruction into a set of signals that can be directly used for executing subsequent pipeline stages. The read stage fetches required operands from the data cache or registers in the register file. The E1 and E2 stages perform the actual program operation (e.g., add, multiply, divide, and the like) on the operands fetched by the read stage and generates the result. The write stage then writes the result generated by the E1 and E2 stages back into the data cache or the register file.

Assuming that each pipeline stage completes its operation in one clock cycle, the exemplary six stage processor pipeline takes six clock cycles to process one instruction. As previously described, once the pipeline is full, an instruction can theoretically be completed every clock cycle.

The throughput of a processor also is affected by the size of the instruction set executed by the processor and the resulting complexity of the instruction decoder. Large instruction sets require large, complex decoders in order to maintain a high processor throughput. However, large complex decoders tend to increase power dissipation, die size and the cost of the processor. The throughput of a processor also may be affected by other factors, such as exception handling, data and instruction cache sizes, multiple parallel instruction pipelines, and the like. All of these factors increase or at least maintain processor throughput by means of complex and/or redundant circuitry that simultaneously increases power dissipation, die size and cost.

In many processor applications, the increased cost, increased power dissipation, and increased die size are tolerable, such as in personal computers and network servers that use x86-based processors. These types of processors include, for example, Intel Pentium™ processors and AMD Athlon™ processors.

However, in many applications it is essential to minimize the size, cost, and power requirements of a data processor. This has led to the development of processors that are optimized to meet particular size, cost and/or power limits. For example, the recently developed Transmeta Crusoe™ processor greatly reduces the amount of power consumed by the processor when executing most x86 based programs. This is particularly useful in laptop computer applications. Other types of data processors may be optimized for use in consumer appliances (e.g., televisions, video players, radios, digital music players, and the like) and office equipment (e.g., printers, copiers, fax machines, telephone systems, and other peripheral devices). The general design objectives for data processors used in consumer appliances and office equipment are the minimization of cost and complexity of the data processor.

One important function that can impact the size, complexity, cost and throughput of a data processor is the cache flushing operation. Cache flushes occur whenever the processor wants to invalidate data in the cache. Depending on the processor architecture, a cache flush may occur for the entire cache or for one or more selected lines in the cache.

Conventional data processors implement a number of different schemes for performing cache flushes. Some processors implement operations in the instruction set architecture (ISA) that execute instruction cache and data cache flush operations on a line-by-line basis or on an address basis. The disadvantage to this technique is that a cache flush is a complex operation to support and in some areas (e.g., embedded processors), it is desirable to avoid adding this overhead to the ISA.

Some processors implement a simpler cache flush operation that flushes all of the data or instruction cache. While this technique may be less complex to implement, it has the disadvantage that the granularity of the flush is the entire cache and it is not possible to individually flush single cache lines. Still other processors rely entirely on software to perform a cache flush. Software can achieve the same effect as a cache flush operation by traversing a properly designed area of memory (code or data) containing no useful values and by making sure that all the interested locations of the cache are touched by the traversal. This technique has the disadvantage that an amount of physical memory equal to the cache size has to be permanently allocated to store the proper values. In some areas where memory is limited (e.g., embedded processor systems), this type of solution is unacceptable.

Therefore, there is a need in the art for data processors that implement simple, adaptable circuitry to perform cache flushes. In particular, there is a need in the art for a data processor that is capable of performing cache flushes on a line-by-line basis without modifying the instruction set architecture to implement complex decode circuitry. More particularly, there is a need in the art for a data processor that is capable of performing cache flush operations on a line-by-line basis without permanently allocating a portion of physical memory equal to the cache size to store the proper values.

SUMMARY OF THE INVENTION

To address the above-discussed deficiencies of the prior art, it is a primary object of the present invention to provide a data processor that includes an instruction execution pipeline having N processing stages and a memory cache including a plurality of storage lines at which data is storable. A cache flush apparatus is coupled to permit access thereof to storage lines of the memory cache of the instruction execution pipeline. The cache flush apparatus is selectably operable to purge at least a selected portion of the memory cache of the instruction execution pipeline. It is a further object of the present invention to provide a method of flushing a data cache associated with a data processor. At least a portion of the data cache is selected at which to flush existing values cached thereat. Selected, arbitrary values are generated at a location separate from the data cache. And, the selected arbitrary values are written to the at least the portion of the data cache, thereby flushing the existing values cached at the selected portion of the data cache.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean is inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

Figure 1:
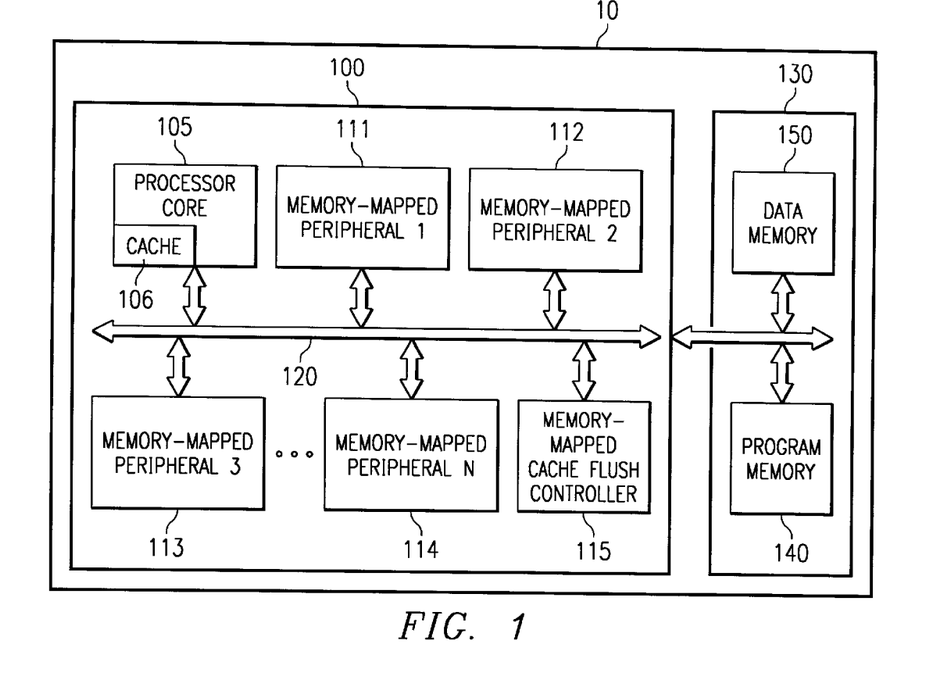
FIG. 1 is a block diagram of a processing system that contains a data processor in accordance with the principles of the present invention.

FIG. 1 is a block diagram of processing system 10, which contains data processor 100 in accordance with the principles of the present invention. Data processor 100 comprises processor core 105 and N memory-mapped peripherals interconnected by system bus 120. The N memory-mapped peripherals include exemplary memory-mapped peripherals 111–114, which are arbitrarily labeled Memory-Mapped Peripheral 1, Memory-Mapped Peripheral 2, Memory-Mapped Peripheral 3, and Memory-Mapped Peripheral N.

The data processor also includes memory-mapped cache flush controller 115 which is selectably operable pursuant to an embodiment of the present invention to purge the contents of cache 106 embodied at processor core 105. Portions of cache 105, such as a single line of cache 106, a plurality of lines of cache 106, or the entire contents of cache 106 can be purged through operation of cache flush controller 115. Processing system 10 also comprises main memory 130. In an advantageous embodiment of the present invention, main memory 130 may be subdivided into program memory 140 and data memory 150.

The cost and complexity of data processor 100 is minimized by excluding from processor core 105 complex functions that may be implemented by one or more of memory-mapped peripherals 111–114. For example, memory-mapped peripheral 111 may be a video codec and memory-mapped peripheral 112 may be an audio codec. Similarly, memory-mapped cache flush controller 115 used to control cache flushing (or purging) of cache 106 is also implemented outside of processor core 105 of data processor 100. The cost and complexity of data processor 100 is further minimized by implementing extremely simple exception behavior in processor core 105, as explained below in greater detail.

Processing system 10 is shown in a general level of detail because it is intended to represent any one of a wide variety of electronic devices, particularly consumer appliances. For example, processing system 10 may be a printer rendering system for use in a conventional laser printer. Processing system 10 also may represent selected portions of the video and audio compression-decompression circuitry of a video playback system, such as a video cassette recorder or a digital versatile disk (DVD) player. In another alternative embodiment, processing system 10 may comprise selected portions of a cable television set-top box or a stereo receiver. The memory-mapped peripherals and a simplified processor core reduce the cost of data processor 100 so that it may be used in such price sensitive consumer appliances.

In the illustrated embodiment, memory-mapped peripherals 111–114 and cache flush controller 115 are shown disposed within data processor 100 and program memory 140 and data memory 150 are shown external to data processor 100. It will be appreciated by those skilled in the art that this particular configuration is shown by way of illustration only and should not be construed so as to limit the scope of the present invention in any way. In alternative embodiments of the present invention, one or more of memory-mapped peripherals 111–114 and cache flush controller 115 may be externally coupled to data processor 100. Similarly, in another embodiment of the present invention, one or both of program memory 140 and data memory 150 may be disposed on-chip in data processor 100.

Figure 2:
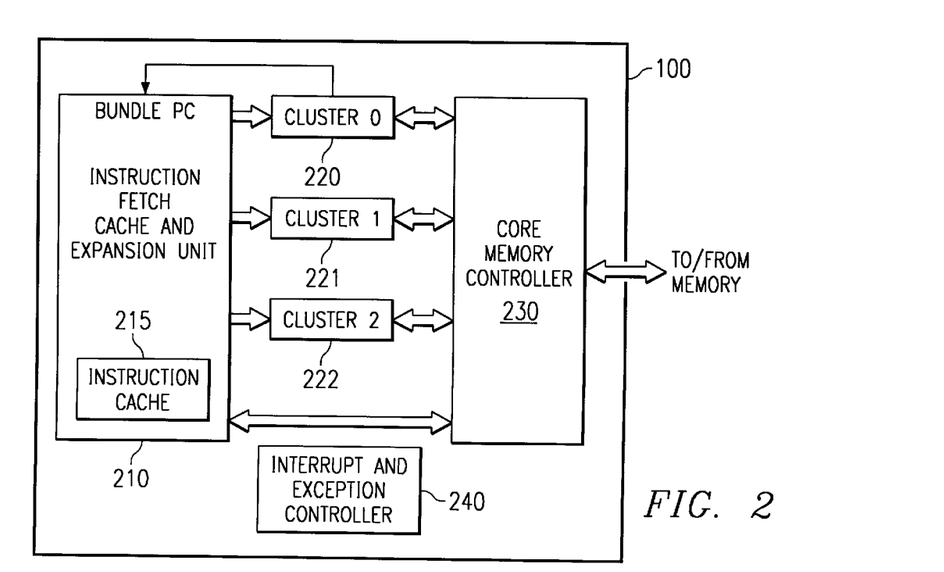
FIG. 2 illustrates the exemplary data processor in greater detail according to one embodiment of the present invention.

FIG. 2 is a more detailed block diagram of exemplary data processor 100 according to one embodiment of the present invention. Data processor 100 comprises instruction fetch cache and expansion unit (IFCEXU) 210, which contains instruction cache 215, and a plurality of clusters, including exemplary clusters 220–222. Exemplary clusters 220–222 are labeled Cluster 0, Cluster 1 and Cluster 2, respectively. Data processor 100 also comprises core memory controller 230 and interrupt and exception controller 240. Instruction cache 215 is representative of cache 106 shown in FIG. 1, here to indicate that the memory cache is here utilized to store program instructions for execution at the processor core.

A fundamental object of the design of data processor 100 is to exclude from the core of data processor 100 most of the functions that can be implemented using memory-mapped peripherals external to the core of data processor 100. By way of example, in an exemplary embodiment of the present invention, cache flushing may be efficiently accomplished using software in conjunction with a small memory-mapped device, here designated at 115. Another object of the design of data processor 100 is to implement a statically scheduled instruction pipeline with an extremely simple exception behavior.

Clusters 220–222 are basic execution units that comprise one or more arithmetic units, a register file, an interface to core memory controller 230, including a data cache, and an inter-cluster communication interface. In an exemplary embodiment of the present invention, the core of data processor 100 may comprise only a single cluster, such as exemplary cluster 220.

Because conventional processor cores can execute multiple simultaneously issued operations, the traditional word "instruction" is hereby defined with greater specificity. For the purposes of this disclosure, the following terminology is adopted. An "instruction" or "instruction bundle" is a group of simultaneously issued operations encoded as "instruction syllables". Each instruction syllable is encoded as a single machine word. Each of the operations constituting an instruction bundle may be encoded as one or more instruction syllables. Hereafter, the present disclosure may use the shortened forms "instruction" and "bundle" interchangeably and may use the shortened form "syllable." In an exemplary embodiment of the present invention, each instruction bundle consists of 1 to 4 instruction syllables. Flow control operations, such as branch or call, are encoded in single instruction syllables.

Figure 3:
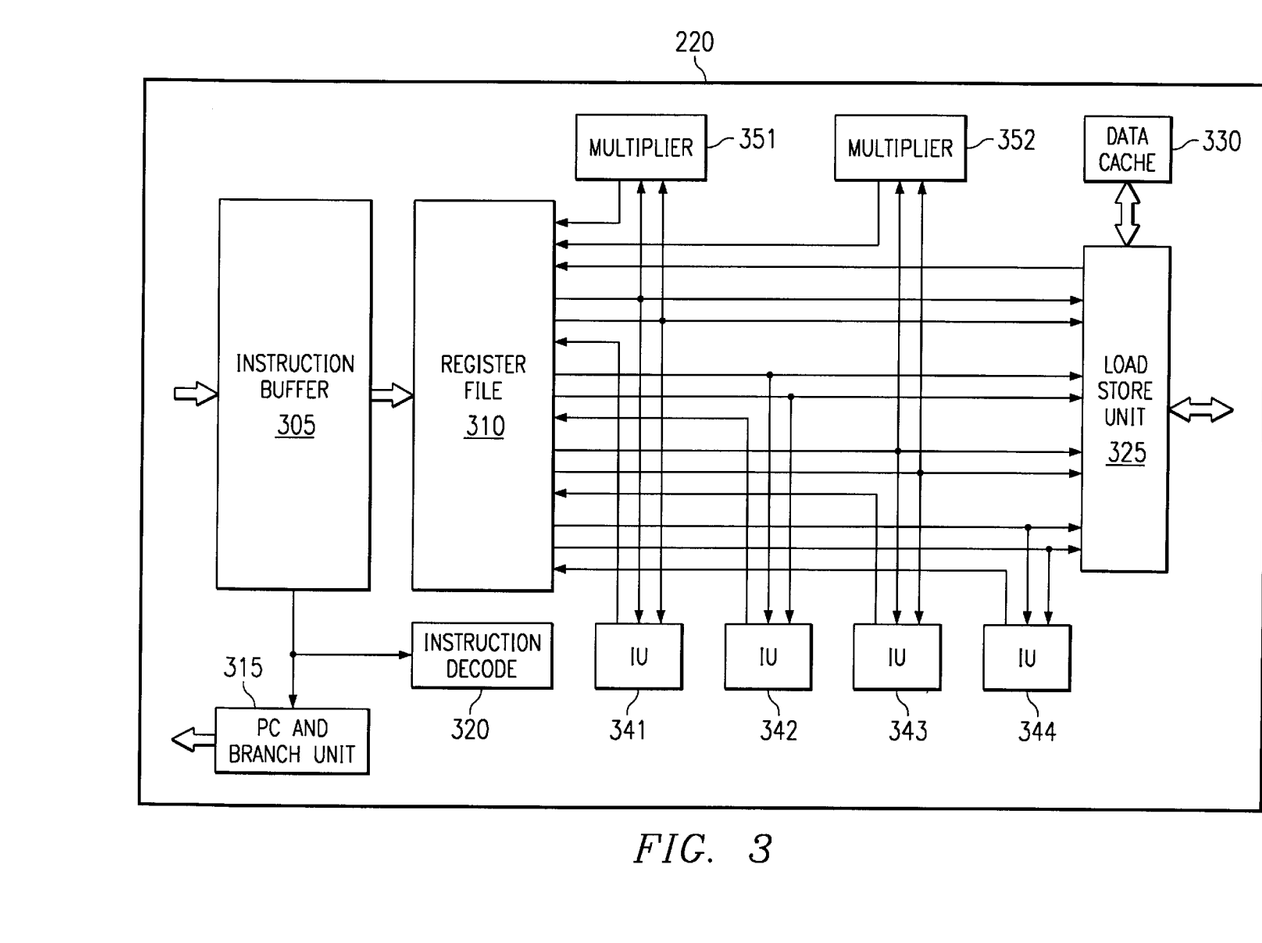
FIG. 3 illustrates a cluster in the exemplary data processor according to one embodiment of the present invention.

FIG. 3 is a more detailed block diagram of cluster 220 in data processor 100 according to one embodiment of the present invention. Cluster 220 comprises instruction buffer 305, register file 310, program counter (PC) and branch unit 315, instruction decoder 320, load store unit 325, data cache 330, integer units 341–344, and multipliers 351–352. Cluster 220 is implemented as an instruction pipeline. The data cache 330 is representative of cache 106 shown in FIG. 1, here designated at 330 to indicate that the memory cache is here utilized to store temporarily data operands, etc. used, or created, during operation of the processor core.

Instructions are issued to an operand read stage associated with register file 310 and then propagated to the execution units (i.e., integer units 341–244, multipliers 351–352). Cluster 220 accepts one bundle comprising one to four syllables in each cycle. The bundle may consist of any combination of four integer operations, two multiplication operations, one memory operation (i.e., read or write), and one branch operation. Operations that require long immediates (i.e., constants) require two syllables.

In specifying a cluster, it is assumed that no instruction bits are used to associate operations with functional units. For example, arithmetic or load/store operations may be placed in any of the four words encoding the operations for a single cycle. This may require imposing some addressing alignment restrictions on multiply operations and long immediates (constants).

This following describes the architectural (programmer visible) status of the core of data processor 100. One design objective of data processor 100 is to minimize the architectural status. All non-user visible status information resides in a memory map, in order to reduce the number of special instructions required to access such information.

Program Counter

In an exemplary embodiment of the present invention, the program counter (PC) in program counter and branch unit 315 is a 32-bit byte address pointing to the beginning of the current instruction bundle in memory. The two least significant bits (LSBs) of the program counter are always zero. In operations that assign a value to the program counter, the two LSBs of the assigned value are ignored.

Register File

In an exemplary embodiment, register file unit 310 contains 64 words of 32 bits each. Reading Register 0 (i.e., R0) always returns the value zero.

Link Register

Register 63 (i.e., R63) is used to address the link register by the call and return instructions. The link register (LR) is a slaved copy of the architecturally most recent update to R63. R63 can be used as a normal register, between call and return instructions. The link register is updated only by writes to R63 and the call instruction. At times the fact that the link register is a copy of R63 and not R63 itself may be visible to the programmer. This is because the link register and R63 get updated at different times in the pipeline. Typically, this occurs in the following cases:

1) ICALL and IGOTO instructions—Since these instructions are executed in the decode stage, these operations require that R63 be stable. Thus, R63 must not be modified in the instruction bundle preceding one of these operations. Otherwise unpredictable results may occur in the event of an interrupt; and 2) An interrupt or exception may update the link register incorrectly. Thus, all interrupt and exception handlers must explicitly write R63 prior to using the link register through the execution of an RFI, ICALL or IGOTO instruction. This requirement can be met with a simple MOV instruction from R63 to R63.

Branch Bit File

The branch architecture of data processor 100 uses a set of eight (8) branch bit registers (i.e., B0 through B7) that may be read or written independently. In an exemplary embodiment of the present invention, data processor 100 requires at least one instruction to be executed between writing a branch bit and using the result in a conditional branch operation.

Control Registers

A small number of memory mapped control registers are part of the architectural state of data processor 100. These registers include support for interrupts and exceptions, and memory protection.

Figure 4:
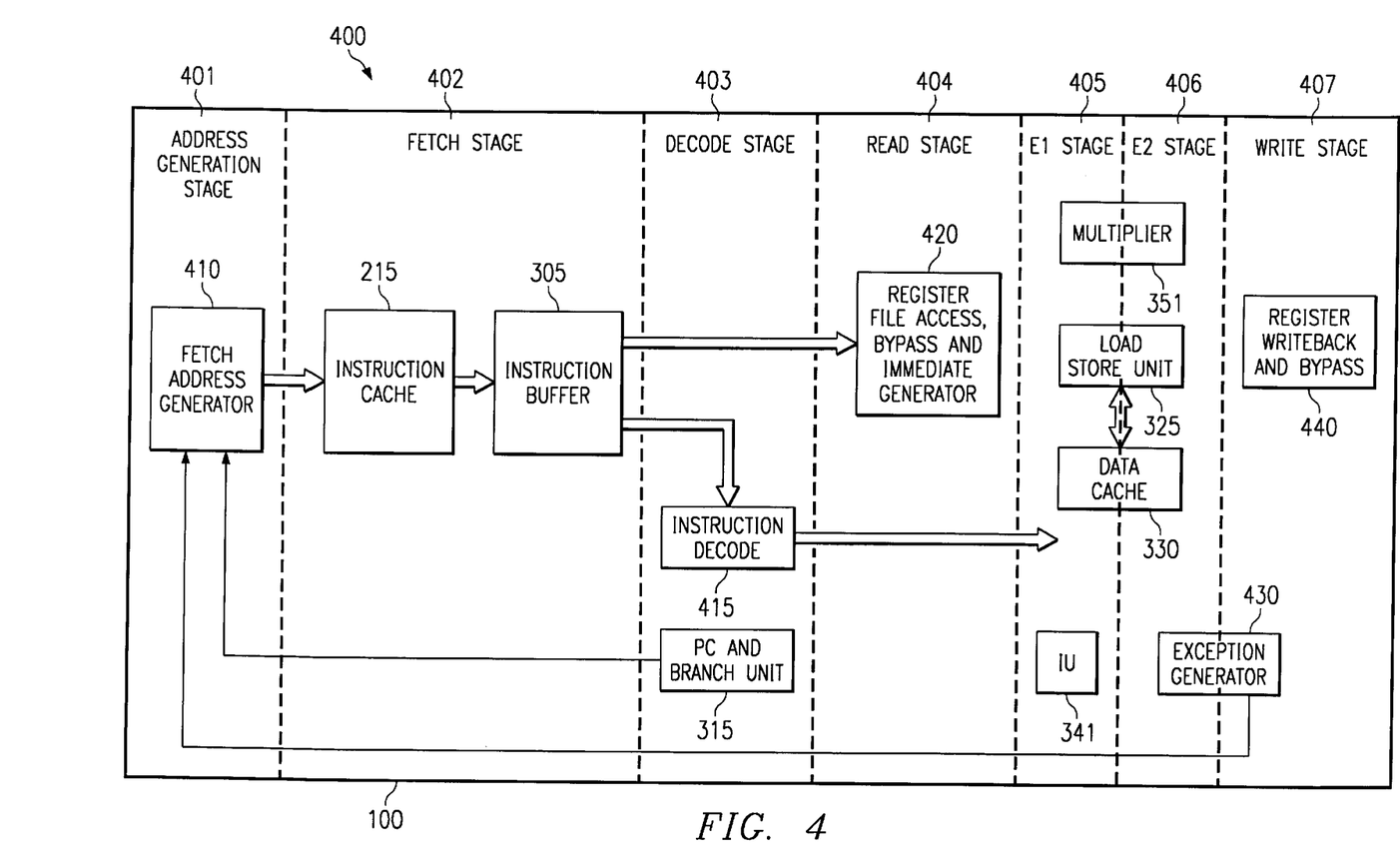
FIG. 4 illustrates the operational stages of the exemplary data processor according to one embodiment of the present invention.

The core of data processor 100 is implemented as a pipeline that requires minimal instruction decoding in the early pipeline stages. One design objective of the pipeline of data processor 100 is that it support precise interrupts and exceptions. Data processor 100 meets this objective by updating architecturally visible state information only during a single write stage. To accomplish this, data processor 100 makes extensive use of register bypassing circuitry to minimize the performance impact of meeting this requirement FIG. 4 is a block diagram illustrating the operational stages of pipeline 400 in exemplary data processor 100 according to one embodiment of the present invention. In the illustrated embodiment, the operational stages of data processor 100 are address generation stage 401, fetch stage 402, decode stage 403, read stage 404, first execution (E1) stage 405, second execution (E2) stage 406 and write stage 407.

Address Generation Stage 401 and Fetch Stage 402

Address generation stage 401 comprises a fetch address generator 410 that generates the address of the next instruction to be fetched from instruction cache 215. Fetch address generator 410 receives inputs from exception generator 430 and program counter and branch unit 315. Fetch address generator 410 generates an instruction fetch address (FADDR) that is applied to instruction cache 215 in fetch stage 402 and to an instruction protection unit (not shown) that generates an exception if a protection violation is found. Any exception generated in fetch stage 402 is postponed to write stage 407. Instruction buffer 305 in fetch stage 402 receives instructions as 128-bit wide words from instruction cache 215 and the instructions are dispatched to the cluster.

Decode Stage 403

Decode stage 403 comprises instruction decode block 415 and program counter (PC) and branch unit 315. Instruction decode block 415 receives instructions from instruction buffer 305 and decodes the instructions into a group of control signals that are applied to the execution units in E1 stage 405 and E2 stage 406. Program counter and branch unit 315 evaluates branches detected within the 128-bit wide words. A taken branch incurs a one cycle delay and the instruction being incorrectly fetched while the branch instruction is evaluated is discarded.

Read Stage 404

In read stage 404, operands are generated by register file access, bypass and immediate (constant) generation block 420. The sources for operands are the register files, the constants (immediates) assembled from the instruction bundle, and any results bypassed from operations in later stages in the instruction pipeline.

E1 Stage 405 and E2 Stage 406

The instruction execution phase of data processor 100 is implemented as two stages, E1 stage 405 and E2 stage 406 to allow two cycle cache access operations and two cycle multiplication operations. Exemplary multiplier 351 is illustrated straddling the boundary between E1 stage 405 and E2 stage 406 to indicate a two cycle multiplication operation. Similarly, load store unit 325 and data cache 330 are illustrated straddling the boundary between E1 stage 405 and E2 stage 406 to indicate a two cycle cache access operation. Integer operations are performed by integer units, such as IU 341 in E1 stage 405. Exceptions are generated by exception generator 430 in E2 stage 406 and write stage 407.

Results from fast operations are made available after E1 stage 405 through register bypassing operations. An important architectural requirement of data processor 100 is that if the results of an operation may be ready after E1 stage 405, then the results are always ready after E1 stage 405. In this manner, the visible latency of operations in data processor 100 is fixed.

Write Stage 407

At the start of write stage 407, any pending exceptions are raised and, if no exceptions are raised, results are written by register write back and bypass block 440 into the appropriate register file and/or data cache location. In data processor 100, write stage 407 is the "commit point" and operations reaching write stage 407 in the instruction pipeline and not "excepted" are considered completed. Previous stages (i.e., address generation, fetch, decode, read, E1, E2) are temporally prior to the commit point. Therefore, operations in address generation stage 401, fetch stage 402, decode stage 403, read stage 404, E1 stage 405 and E2 stage 406 are flushed when an exception occurs and are acted upon in write stage 407.

Load operations that transfer data from data cache 330 to the register files are performed in E1 stage 405, E2 stage 406, and write stage 407. Data shifting is performed early in write stage 407 prior to loading the data into the appropriate register file in register write back and bypass block 440. In order to maximize processor throughput, the present invention implements bypassing circuitry in the pipeline that permits data from load word operations to bypass the shifting circuitry in write stage 407.

Figure 5:
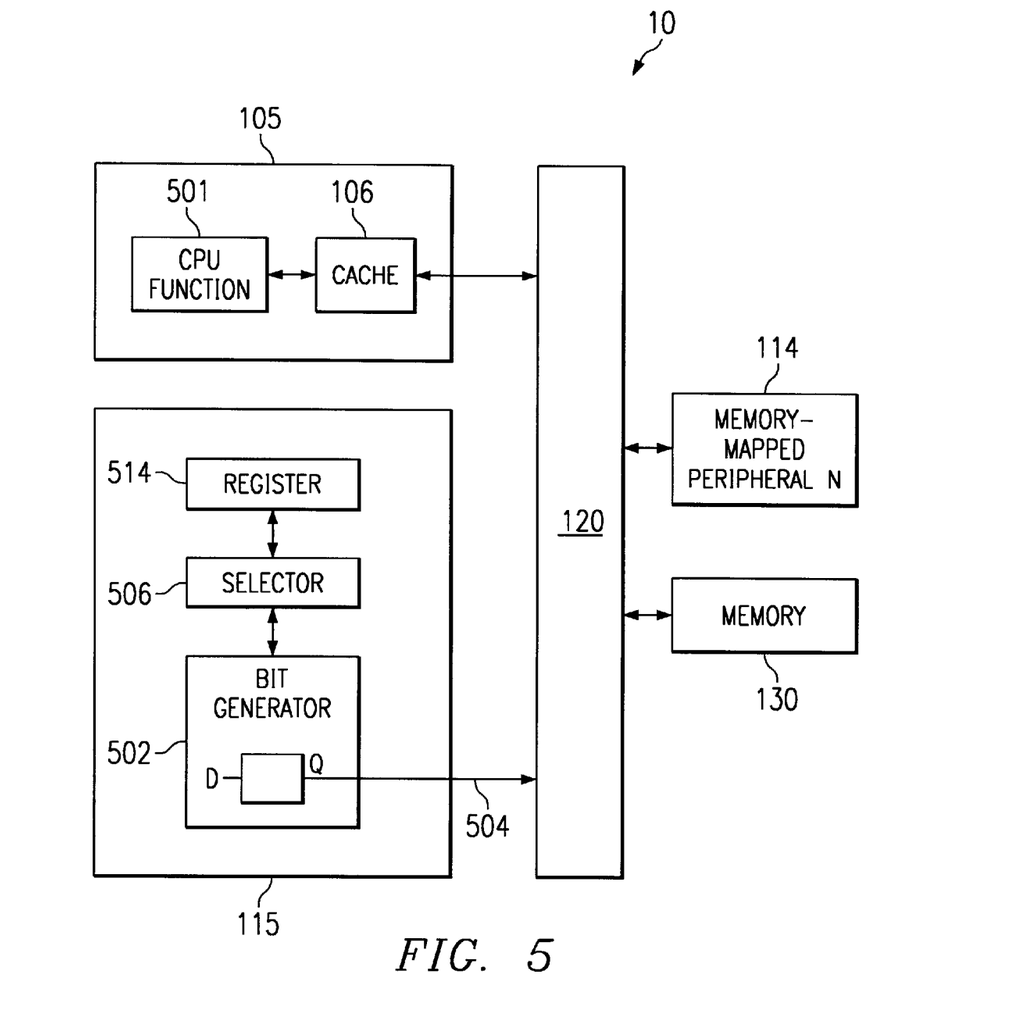
FIG. 5 illustrates portions of the processing system shown in FIG. 1, including the memory-mapped cache flush controller of an embodiment of the present invention.

FIG. 5 illustrates a functional block diagram of portions of processing system 10, here illustrated to represent operation of memory-mapped cache flush controller 115. Cache flush controller 115 is represented functionally in FIG. 5 and the functional operation of cache flush controller 115 can be physically implemented in any desired manner, such as, in part, by a state machine implementation.

Cache 106 and the CPU function, here designated at 501, of processor core 105 are also shown, here in which the elements are represented separately. During operation of the CPU function of processor core 105, the contents of cache 106 are read from, and written to, as appropriate. Main memory 130 and an exemplary memory-mapped peripheral, namely memory-mapped peripheral 114, are further shown in FIG. 5. The processor core 105, memory-mapped peripheral N, cache flush controller 115, and main memory 130 are all again shown to be interconnected by way of system bus 120.

Through operation of cache flush controller 115, cache flushes of cache 106 are effectuated. Cache 106 flushes are performed without necessitating ISA (Instruction Set Architecture) support and without dedicating a large physical memory conventionally required in conventional manners by which to perform cache flushes.

Cache flush controller 115 here includes a bit-value generator 502 which generates binary values on line 504. The generator comprises, for instance, a logical gate device which generates Logic 1 or Logic 0 values.

The values generated on line 504 are selectively applied to selected address locations (i.e., storage lines) of cache 106 by way of the system bus 120. When applied thereto, existing values stored at the address are written over, thereby purging the existing values with the arbitrary, selected values generated by the bit generator. Control over when, and to where, the bit values are written is exerted by operation of the processor core, such as by operation of selector 506, functionally represented in the Figure.

Selection is made during operation of the cache flush controller to which of the one or more storage lines, or addresses, of cache 106 that values generated on the line 504 are to be applied. Lines extending from main memory 130 and the exemplary memory-mapped peripheral 114, also connected to system bus 120, also indicate the selectable manner by which the memory and peripheral are connectable to cache 106 and, in turn, the CPU function of core processor 105. Control over which element, if any, is permitted to access cache 106 is exerted by cache flush controller 115. When address locations of cache 106 are to be flushed, system bus 120 passes the values generated on line 504 to cause the selected address locations to be written over with the generated bit values.

Cache flush controller 115 advantageously avoids the conventional need for ISA (Instruction Set Architecture) support. Also, cache flush controller 115 can be retrofitted into existing processing system designs as the controller operates at the memory bus level, outside of the processor core. Physical memory space also is not wasted as the controller provides merely virtual memory values to write over existing values cached at cache 106.

Generally, flushing of a cache line involves two steps. First, the line is marked to be invalid. And, then, the contents of the line are written back if cache 106 is in a copy-back mode and the line is dirty.

When cache 106 forms a data cache, a possible way of invalidating a storage (i.e., cache) line is to load data from an address that is known not to be used in a particular application, thus making the data invalid. Consequently, a block of memory can be reserved for this purpose, and the address corresponding to the line that is to be flushed is accessed. If cache 106 forms a set-associative cache, the locations whose address is a multiple of the cache lines can be looped-over with as many iterations as the associativity degree. As an example, exemplary line one hundred of a two-way associative cache having two hundred fifty-six lines is flushed by accessing two locations at flush_area [100] and flush_area [100+256]. Flush_area [0] is assumed to be aligned to the size of the cache.

When cache 106 forms an instruction cache, a similar procedure is utilized but with a somewhat different traversing procedure. A location of the instruction cache flush area contains a jump instruction that unconditionally branches to a subsequent location of the flush area. The last location of the flush area contains a return instruction. In this manner, it is possible to call the beginning of the flush area and to produce the effect of loading the instruction cache with invalid operations (i.e., operations that do not belong to the application space).

Conventional, pure software-implemented manners by which to implement flush operations require a reserved memory area corresponding in size to that of the instruction and data cache while utilization of cache flush controller 115 of an embodiment of the present invention obviates that need for a correspondingly large memory area.

When a memory cache, or a portion thereof, is to be flushed, up to three sets of address ranges are mapped. A data flush area, an instruction flush area, and a line flush area all are address ranges which are mapped.

When accessed in the data flush area and the entire data cache or individual lines thereof are to be flushed, a predefined value, (e.g., a Logic 0 value is returned by cache flush controller 115). When accessed in the instruction flush area and the entire instruction cache is to be flushed, a binary representation of the instruction "jump PC+line size" is returned by the controller when the instruction flush area is accessed at a location such that 0 is less than or equal to the location of cache 106 which is less than the instruction cache size less one. And, a binary representation of the RETURN instruction is returned by the controller when the flush area is accessed at a location of the instruction cache size less one. When accessed in a line flush area to flush a line of the instruction cache, the controller returns a target binary representation of a RETURN instruction for all locations.

In the exemplary implementation, memory-mapped registers, of which register 514 is shown in FIG. 5, are used to program cache flush controller 115. Values stored at the registers are used to define the initial address and size of the data and instruction flush areas, the initial address and size of a line flush area, and to define the binary representations of "JUMP PC+line size" and RETURN instructions for the processor.

Because neither specific ISA support nor large memory areas need to be reserved to provide for cache flushing operations, utilization of cache flush controller 115 of an embodiment of the present invention obviates problems associated with conventional manners by which to purge a memory cache. And, because the controller is operable at the memory bus level of a data processor, the controller can easily be added to an existing processor design.

Although the present invention has been described in detail, those skilled in the art should understand that they can make various changes, substitutions and alterations herein without departing from the spirit and scope of the invention in its broadest form.

What is claimed is:

1. A data processor comprising:
   an instruction execution pipeline comprising N processing stages and a memory cache having a plurality of storage lines at which data is storable; and
   a cache flush apparatus coupled to said instruction execution pipeline and said memory cache via a shared system bus and capable of accessing said memory cache via said shared system bus, wherein said cache flush apparatus is selectably operable to purge at least a selected portion of the memory cache of said instruction execution pipeline by writing over existing data in the selected portion of the memory cache with invalid data.

2. The data processor as set forth in claim 1 wherein the memory cache comprises a data cache at which data is stored and wherein said cache flush apparatus is selectably operable to purge at least a selected storage line of the data cache.

3. The data processor as set forth in claim 1 wherein the memory cache comprises an instruction cache at which instructions are stored at the storage lines thereof and wherein said cache flush apparatus is selectably operable to purge at least an instruction stored on at least a selected one of the storage lines of the instruction cache.

4. The data processor as set forth in claim 3 wherein said cache flush apparatus purges the instruction cache prior to loading of executable code formed of instructions at the storage lines of the instruction cache which forms the memory cache.

5. The data processor as set forth in claim 1 wherein said cache flush apparatus purges the at least the selected portion of the memory cache by writing data of arbitrary, selected values to at least a selected storage line of the memory cache.

6. The data processor as set forth in claim 5 wherein the arbitrary, selected values written by said cache flush apparatus to the at least the selected storage line of the memory cache comprise binary values generated at said cache flush apparatus.

7. The data processor as set forth in claim 6 wherein said cache flush apparatus further comprises a bit-value generator for generating the bits written to the at least the selected storage line of the memory cache.

8. The data processor as set forth in claim 7 wherein said cache flush apparatus further comprises a selector, said selector for selecting to which of the at least the selected storage line that the bits of the arbitrary, selected values are to be written.

9. The data processor as set forth in claim 8 wherein the storage lines are identified by addresses and wherein said selector selects to which addresses of the memory cache that the bit-value generator writes the binary values generated thereat.

10. The data processor as set forth in claim 1 wherein the memory cache comprises an instruction cache and wherein the binary values generated at said cache flush apparatus are of values representative of a jump command when executed by said instruction execution pipeline.

11. A processing system comprising:
    a data processor;
    a memory coupled to said data processor;
    a plurality of memory-mapped peripheral circuits coupled to said data processor for performing selected functions in association with said data processor, wherein said data processor comprises:
       an instruction execution pipeline comprising N processing stages and a memory cache having a plurality of storage lines at which data is storable; and
       a cache flush apparatus coupled to said instruction execution pipeline and said memory cache via a shared system bus and capable of accessing said memory cache via said shared system bus, wherein said cache flush apparatus is selectably operable to purge at least a selected portion of the memory cache of said instruction execution pipeline by writing over existing data in the selected portion of the memory cache with invalid data.

12. The processing system as set forth in claim 11 wherein the memory cache comprises a data cache at which data is stored and wherein said cache flush apparatus is selectably operable to purge at least a selected storage line of the data cache.

13. The processing system as set forth in claim 11 wherein the memory cache comprises an instruction cache at which instructions are stored at the storage lines thereof and wherein said cache flush apparatus is selectably operable to purge at least an instruction stored on at least a selected one of the storage lines of the instruction cache.

14. The processing system as set forth in claim 11 wherein said cache flush apparatus purges the at least the selected portion of the memory cache by writing data of arbitrary, selected values to at least a selected storage line of the memory cache.

15. The processing system as set forth in claim 14 wherein the arbitrary values, selected values written by said cache flush apparatus to the at least the selected storage line of the memory cache comprise binary values generated at said cache flush apparatus.

16. The processing system as set forth in claim 15 wherein said cache flush apparatus further comprises a bit-value generator for generating the bits written to the at least the selected storage line of the memory cache.

17. The processing system as set forth in claim 16 wherein said cache flush apparatus further comprises a selector, said selector for selecting to which of the at least the selected storage line that the bits of the arbitrary, selected values are to be written.

18. The processing system as set forth in claim 17 wherein the storage lines are identified by addresses and wherein said selector selects to which addresses of the memory cache that the bit-value generator writes the binary values generated thereat.

19. The processing system as set forth in claim 11 wherein the memory cache comprises an instruction cache and wherein the binary values generated at said cache flush apparatus are of values representative of a jump command when executed by said instruction execution pipeline.

20. For use in a data processor comprising an instruction execution pipeline comprising N processing stages, a method of flushing a data cache associated with said data processor, said method comprising:

selecting at least a portion of the data cache at which to flush existing values cached thereat;

generating selected, arbitrary values in a peripheral device separate from the data cache, wherein the peripheral device is coupled to the data cache via a shared system bus and is capable of accessing the data cache via the shared system bus; and     writing the selected arbitrary values generated during said operation of generating to the at least the portion of the data cache via the shared system bus, thereby flushing the existing values cached at the portion of the data cache selected during said operation of selecting.

* * * * *